(12) United States Patent
Miyagawa et al.

(10) Patent No.: US 12,091,245 B2
(45) Date of Patent: Sep. 17, 2024

(54) TRAVELING PLATFORM, AND AUTOMATIC WAREHOUSE

(71) Applicant: MURATA MACHINERY, LTD., Kyoto (JP)

(72) Inventors: Akinori Miyagawa, Inuyama (JP); Makoto Konishi, Inuyama (JP)

(73) Assignee: MURATA MACHINERY, LTD., Kyoto (JP)

( * ) Notice: Subject to any disclaimer, the term of this patent is extended or adjusted under 35 U.S.C. 154(b) by 122 days.

(21) Appl. No.: 17/921,421

(22) PCT Filed: Mar. 25, 2021

(86) PCT No.: PCT/JP2021/012701
§ 371 (c)(1),
(2) Date: Oct. 26, 2022

(87) PCT Pub. No.: WO2021/220686
PCT Pub. Date: Nov. 4, 2021

(65) Prior Publication Data
US 2023/0183001 A1    Jun. 15, 2023

(30) Foreign Application Priority Data

Apr. 30, 2020 (JP) ................. 2020-080377

(51) Int. Cl.
*B65G 1/04* (2006.01)
(52) U.S. Cl.
CPC .... *B65G 1/0435* (2013.01); *B65G 2203/0283* (2013.01); *B65G 2203/044* (2013.01)

(58) Field of Classification Search
CPC ............................ B65G 1/0492; B65G 1/0435
See application file for complete search history.

(56) References Cited

U.S. PATENT DOCUMENTS

| | | | |
|---|---|---|---|
| 5,551,350 A * | 9/1996 | Yamada ............... | B65G 1/0492 104/293 |
| 5,927,926 A * | 7/1999 | Yagi .................... | B65G 1/0407 414/280 |
| 2006/0045672 A1* | 3/2006 | Maynard .............. | B65G 1/0435 414/276 |
| 2011/0008138 A1* | 1/2011 | Yamashita ........... | B65G 1/0435 414/277 |
| 2015/0081089 A1* | 3/2015 | Kapust ................ | B65G 1/1373 700/218 |
| 2018/0134488 A1* | 5/2018 | Grosse ................ | B65G 1/0435 |
| 2018/0370729 A1* | 12/2018 | Ueda ................... | B65G 1/1376 |
| 2019/0092570 A1* | 3/2019 | Macdonald .......... | B65G 1/1373 |
| 2020/0270059 A1* | 8/2020 | Frederiks ............. | B65G 1/0492 |
| 2023/0001959 A1* | 1/2023 | Iwata .................... | B61B 13/02 |
| 2023/0012915 A1* | 1/2023 | Camboni ............. | B65G 1/0492 |

(Continued)

FOREIGN PATENT DOCUMENTS

JP        11-278607 A        10/1999

*Primary Examiner* — Kaitlin S Joerger
(74) *Attorney, Agent, or Firm* — Keating & Bennett, LLP (57) ABSTRACT

A traveling platform includes a side arm, a first guide, and two or more travel auxiliary rollers. The side arm expands and retracts in a Y direction. The first guide extends in an X direction and includes a third inside surface to guide the side arm in the X direction. The two or more travel auxiliary rollers are provided to the first guide and restrict movement of the traveling platform in the Y direction.

10 Claims, 9 Drawing Sheets

(56) References Cited

U.S. PATENT DOCUMENTS

| | | | |
|---|---|---|---|
| 2023/0050980 A1* | 2/2023 | Zahdeh | G01S 17/89 |
| 2023/0075455 A1* | 3/2023 | Zahdeh | G05D 1/0088 |
| 2023/0140603 A1* | 5/2023 | Del Popolo | B65G 1/0492 |
| | | | 700/218 |
| 2023/0183000 A1* | 6/2023 | Sebastian | B65G 1/0414 |
| | | | 414/284 |
| 2023/0183001 A1* | 6/2023 | Miyagawa | B65G 1/065 |
| | | | 414/280 |
| 2023/0312246 A1* | 10/2023 | Chen | B65G 1/0492 |
| | | | 414/279 |
| 2023/0312247 A1* | 10/2023 | Kuroda | B65G 1/0421 |
| | | | 414/279 |
| 2023/0322489 A1* | 10/2023 | Reckemeier | B65G 1/0492 |
| | | | 700/218 |

* cited by examiner

TRAVELING PLATFORM, AND AUTOMATIC WAREHOUSE

BACKGROUND OF THE INVENTION

1. Field of the Invention

The present invention relates to a traveling platform that travels in a predetermined direction, in particular, a traveling platform that travels while being guided by a traveling rail extending in the predetermined direction, and to an automatic warehouse including the traveling platform and a rack that stores an article.

2. Description of the Related Art

Conventionally, there is known a traveling platform that is provided to each of a plurality of shelves arranged in a height direction and travels in a length direction of the shelf to which it is provided. This traveling platform is guided by a traveling rail extending in the length direction of the shelf to which it is provided, to travel in the length direction of the shelf. In addition, this traveling platform includes a pair of travel auxiliary rollers that assist traveling of the traveling platform and are arranged in a length direction of the traveling rail (see, for example, JP-A-H11-278607).

SUMMARY OF THE INVENTION

In the conventional traveling platform, one of the pair of travel auxiliary rollers is attached to a front frame disposed on a front side in a travel direction, while the other travel auxiliary roller is attached to a rear frame disposed on a rear side in the travel direction. In addition, the front frame and the rear frame are connected with a pair of members extending in the travel direction of the traveling platform.

In the traveling platform having the structure described above, the front frame and the rear frame may not be arranged exactly parallel to each other, due to a machining error of the members connecting the front frame and the rear frame, an assembly error when connecting the front frame and the rear frame, a machining error of other components of the traveling platform, and/or an assembly error of the other components. As a result, the travel auxiliary roller provided to the front frame and the travel auxiliary roller provided to the rear frame may not be arranged accurately parallel to the travel direction.

If the travel auxiliary rollers are not arranged accurately parallel to the travel direction, the traveling platform is not arranged appropriately with respect to the traveling rail, and hence the traveling platform cannot appropriately travel along the traveling rail.

Preferred embodiments of the present invention arrange travel auxiliary rollers accurately in a travel direction, in a traveling platform that travels in a predetermined travel direction and includes the travel auxiliary rollers arranged in the travel direction.

A plurality of preferred embodiments of the present invention are described below and can be arbitrarily combined as necessary or desired.

A traveling platform according to a preferred embodiment of the present invention is a traveling platform that travels along a travel route extending in a first direction. The traveling platform includes a side arm, a guide, and two or more travel auxiliary rollers.

The side arm is expandable and retractable in a second direction. The second direction is a direction perpendicular to the first direction in a horizontal direction.

The guide extends in the first direction and includes a guide surface to guide the side arm in the first direction.

The two or more travel auxiliary rollers are provided to the guide to restrict movement of the traveling platform in the second direction.

In the traveling platform described above, the plurality of travel auxiliary rollers are provided to the guide extending in the first direction that is the same as the travel direction of the traveling platform. As the guide extends in the first direction, i.e., in the travel direction of the traveling platform, when providing the plurality of travel auxiliary rollers to the guide, the plurality of travel auxiliary rollers can be arranged accurately in the travel direction of the traveling platform. As a result, straight travelling stability of the traveling platform can be improved.

The guide may be provided along the entire length of the traveling platform in the first direction. In addition, the guide may include a first portion to guide the side arm and a second portion positioned outside of the first portion in the first direction. In this case, the travel auxiliary rollers may be provided to the second portion of the guide.

As the travel auxiliary rollers are provided to the second portion of the guide, the travel auxiliary rollers can be provided at ends of the entire length of the traveling platform in the first direction, and hence, the travel auxiliary rollers can be disposed in parallel to the travel direction over the entire length of the traveling platform in the first direction. As a result, the straight travelling stability of the traveling platform can be improved.

In the traveling platform, a plurality of the guides may be positioned with a space therebetween in the second direction. In this case, the traveling platform may further include a first connector and a second connector. The first connector and the second connector connect a pair of the guides at insides of the guides in the second direction, on end sides of the pair of guides in the first direction.

In this way, while the guides work to guide the side arm in the first direction, the traveling platform can be assembled with reference to the guides. In other words, the guides can have a functionality of guiding the side arm and a functionality as a frame of the traveling platform. As a result, the number of components of the traveling platform can be reduced.

The traveling platform may further include an auxiliary structure provided to the guide. The auxiliary structure may include at least one of a current collector to supply power to the traveling platform, a detector to detect a travelling position of the traveling platform, a stopper to stop the traveling platform, and a photoelectric emitter to emit light outward in the first direction.

In this way, as the auxiliary structure that assists the travel of the traveling platform is positioned with reference to the guide, the auxiliary structure can be easily assembled to the traveling platform.

The photoelectric emitter may be attached to a mounting surface of a mount that abuts the guide to emit the light outward in the first direction. In this way, by utilizing the structural arrangement that the guide is parallel to the first direction, the direction of light emission from the photoelectric device is brought near parallel to the first direction, such that a deviation between the direction of light emission from the photoelectric device and the first direction can be reduced.

The traveling platform may further include a block. The block is inserted into a space in the guide and is fixed to the guide. At least one of the travel auxiliary roller and the auxiliary structure is attached to the block.

In this way, the travel auxiliary roller and/or the auxiliary structure are commonly attached to the block, and the travel auxiliary roller and/or the auxiliary structure can be easily attached to the guide.

The travel route may include a travel flat portion and a movement restriction portion. The travel flat portion is a portion that is a travel flat surface on which the traveling platform travels. The movement restriction portion is a portion extending in a third direction from the travel flat portion, and the movement of the traveling platform in the second direction is restricted by abutting the travel auxiliary roller. The third direction is a direction perpendicular to the first direction and to the second direction.

In this way, the travel route has a functionality as a travel route of the traveling platform and a functionality of restricting the movement of the traveling platform in the second direction.

The travel auxiliary roller may include a pair of rollers positioned with a predetermined space therebetween in the second direction. In addition, the movement restriction portion is sandwiched between the pair of rollers. In this way, the movement of the traveling platform in the second direction can be more restricted.

A cross section of the guide may have a C-shape, an L-shape, or a rectangular shape. In this way, the guide can have a high stiffness.

From the state in which the block is inserted in the guide, the block may be able to extracted from an end of the guide in the first direction. In addition, the block may be able to be inserted into the guide by inserting it into the end of the guide in the first direction.

In this way, in a state where the traveling platform is set to the travel route, the travel auxiliary roller and/or the auxiliary structure can be easily detached from and attached to the guide.

An automatic warehouse according to another preferred embodiment of the present invention includes the traveling platform described above, and a rack to store an article transferred from the traveling platform, and/or packages to be transferred to the traveling platform.

As the plurality of travel auxiliary rollers are provided to the guide parallel to the travel direction of the traveling platform, the plurality of travel auxiliary rollers can be accurately arranged in the travel direction of the traveling platform. As a result, the straight travelling stability in the first direction can be improved.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

1. First Preferred Embodiment

Figure 1:
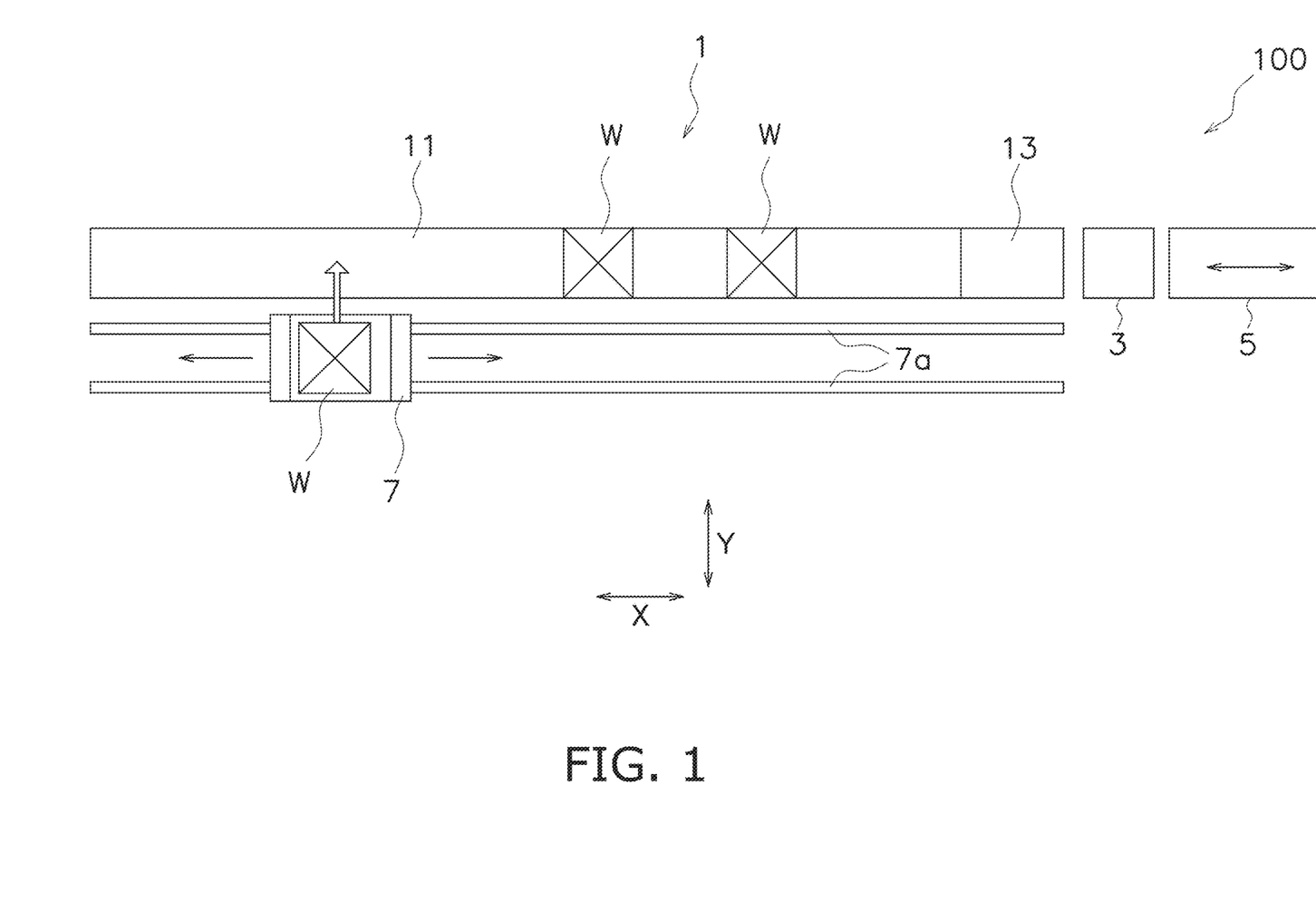
FIG. 1 is a top view of an automatic warehouse.
Figure 2:
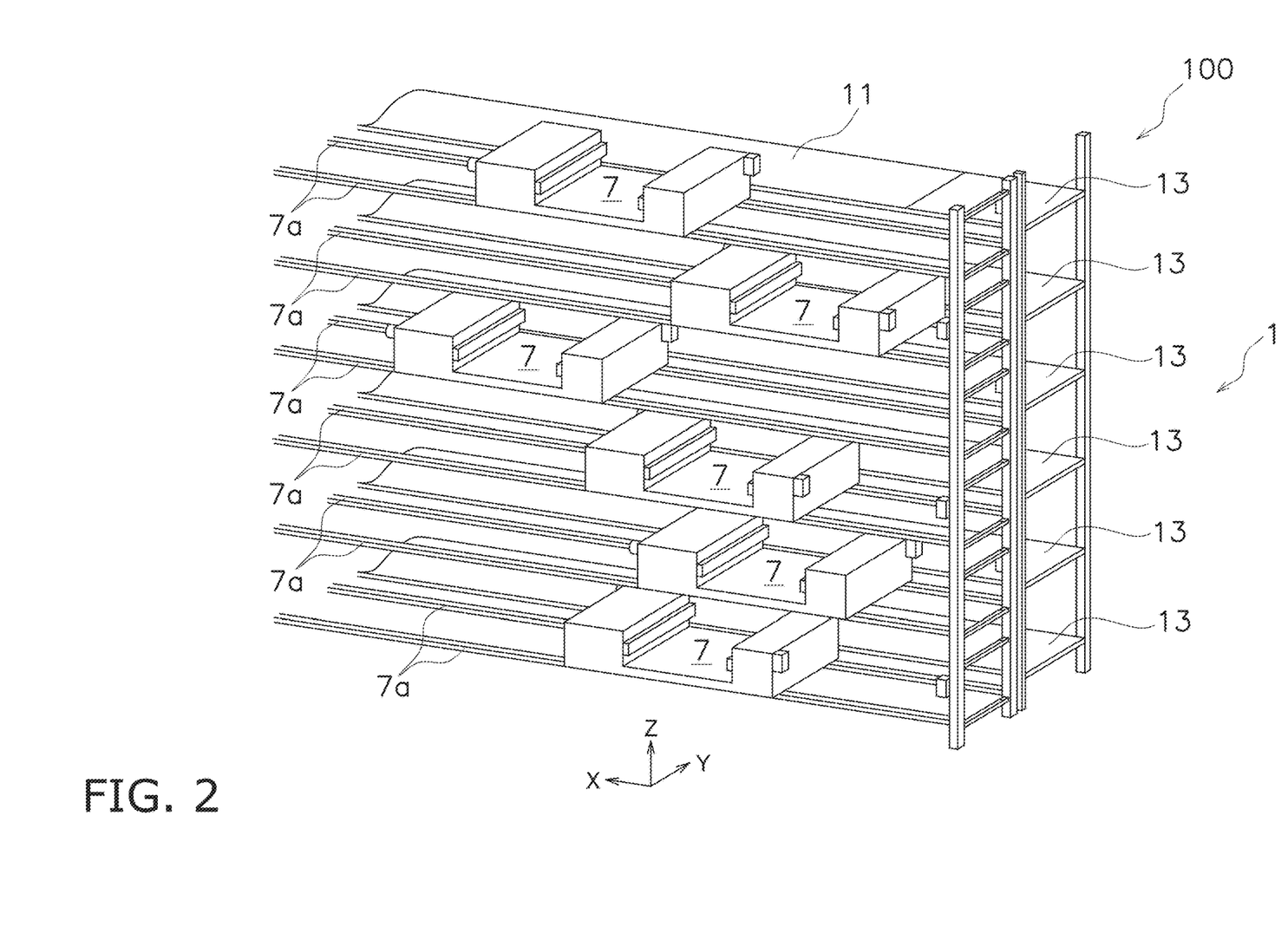
FIG. 2 is a perspective view of traveling platforms and a rack.
Figure 3:
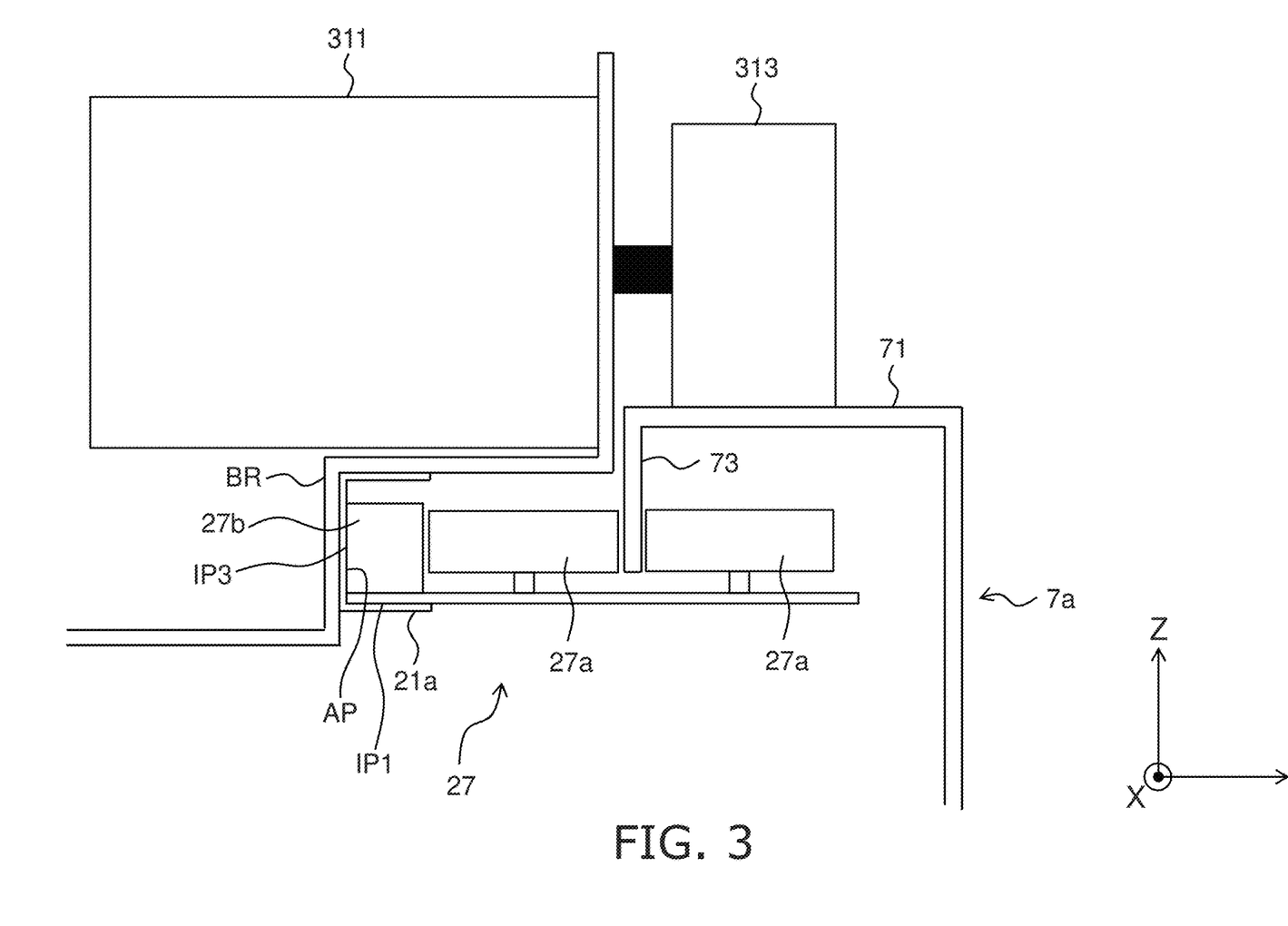
FIG. 3 is an enlarged view of a traveling unit and its vicinity of the traveling platform viewed from an X direction.

Hereinafter, with reference to FIGS. 1 to 3, an automatic warehouse 100 is described in which traveling platforms 7 according to a first preferred embodiment are disposed. FIG. 1 is a top view of the automatic warehouse 100, and FIG. 2 is a perspective view of the traveling platforms 7 and a rack 1. FIG. 3 is an enlarged view of a traveling unit 31 and its vicinity of the traveling platform 7 viewed from an X direction. In the following description, the left and right direction in FIG. 1 is referred to as the X direction (an example of the first direction), and the up and down direction in FIG. 1, i.e., the direction perpendicular to the X direction on a horizontal plane is referred to as a Y direction (an example of the second direction). The direction perpendicular to the X direction and to the Y direction, i.e., the up and down direction in FIG. 2 is referred to as a Z direction (an example of the third direction).

The automatic warehouse 100 includes the rack 1, an elevating carrier device 3, a storage and retrieval station 5, a plurality of the traveling platforms 7, and rails 7a (an example of the travel route).

The rack 1 stores an article W. Specifically, the rack 1 include a plurality of shelves 11. The plurality of shelves 11 extend in the X direction, and are arranged with predetermined spaces therebetween in the Z direction. The article W is placed and stored on one of the plurality of shelves 11.

In addition, each shelf 11 is provided with a relay conveyor 13. The relay conveyor 13 is disposed near the elevating carrier device 3, and the article W to be stored is transferred from the elevating carrier device 3 to the relay conveyor 13. In addition, the article W to be retrieved is transferred from the traveling platform 7 to the relay conveyor 13.

In this preferred embodiment, as illustrated in FIG. 1, the rack 1 is disposed only on one side of the traveling platform 7 (the rails 7a) in the Y direction. However, without limiting to this, the rack 1 may be disposed on both sides of the traveling platform 7 (the rails 7a) in the Y direction.

The elevating carrier device 3 is disposed between the rack 1 and the storage and retrieval station 5, and has an elevating table. In the elevating carrier device 3, the elevating table can move up and down in the Z direction in a state supporting a plurality of articles. The elevating table has a conveyor that transfers the article W between the storage and retrieval station 5 and the relay conveyor 13 of the rack 1, for example.

The storage and retrieval station 5 conveys the article W to be stored (stocked) on the shelf 11 of the rack 1, to a vicinity of the lift and transport device 3 from outside. In addition, the storage and retrieval station 5 conveys the article W conveyed by the lift and transport device 3 to retrieve to the outside. The storage and retrieval station 5 is a transport device such as a belt conveyor, for example.

The rails 7a are members provided to each shelf 11 of the rack 1 to extend in the X direction. The traveling platform 7 provided to each shelf 11 is guided by the rails 7a provided to the corresponding shelf 11 to travel in the X direction. As illustrated in FIG. 3, the rail 7a has a travel flat part 71 and a movement restriction part 73.

The travel flat part 71 is a part that is parallel to an X-Y plane and extends in the X direction, and is a travel flat surface on which the traveling platform 7 travels. The movement restriction part 73 is a part that extends in the Z direction from an end in the Y direction of the travel flat part 71 and extends in the X direction. The movement restriction part 73 restricts movement of the traveling platform 7 in the Y direction by abutting rollers 27a of a travel auxiliary roller 27.

As the rail 7a has the travel flat part 71 and the movement restriction part 73 described above, the rails 7a can have function as the travel route of the traveling platform 7 and function of restricting movement of the traveling platform 7 in the Y direction.

Each of the plurality of traveling platforms 7 preferably is a carriage that can travel in the X direction at a height corresponding to that of each shelf 11. The traveling platform 7 is guided by the rails 7a extending in the X direction at a height corresponding to each shelf 11 so as to travel in the X direction. In addition, the traveling platform 7 includes a transfer device 25 (FIG. 4) that transfers the article W to and from the relay conveyor 13 of the rack 1, and the shelf 11.

With the structure described above, the traveling platform 7 travels in the X direction along the shelf 11 to which it is disposed, in the state holding the article W, and hence it can convey the held article W in the X direction. In addition, using the transfer device provided to the traveling platform 7, it is possible to transfer the article W between the traveling platform 7 and the relay conveyor 13, and between the traveling platform 7 and the shelf 11.

Specifically, when storing the article W, the article W transferred from the lift and transport device 3 to the relay conveyor 13 is transferred to the traveling platform 7, and then the traveling platform 7 moves in the X direction to a target position on the shelf 11, and the article W is transferred from the traveling platform 7 to the shelf 11 at the target position.

In contrast, when retrieving the article W, the traveling platform 7 moves in the X direction to a target position on the shelf 11, and the article W is transferred from the shelf 11 to the traveling platform 7 at the target position. Then, the traveling platform 7 moves in the X direction to a position of the relay conveyor 13, and the article W is transferred from the traveling platform 7 to the relay conveyor 13.

Figure 4:
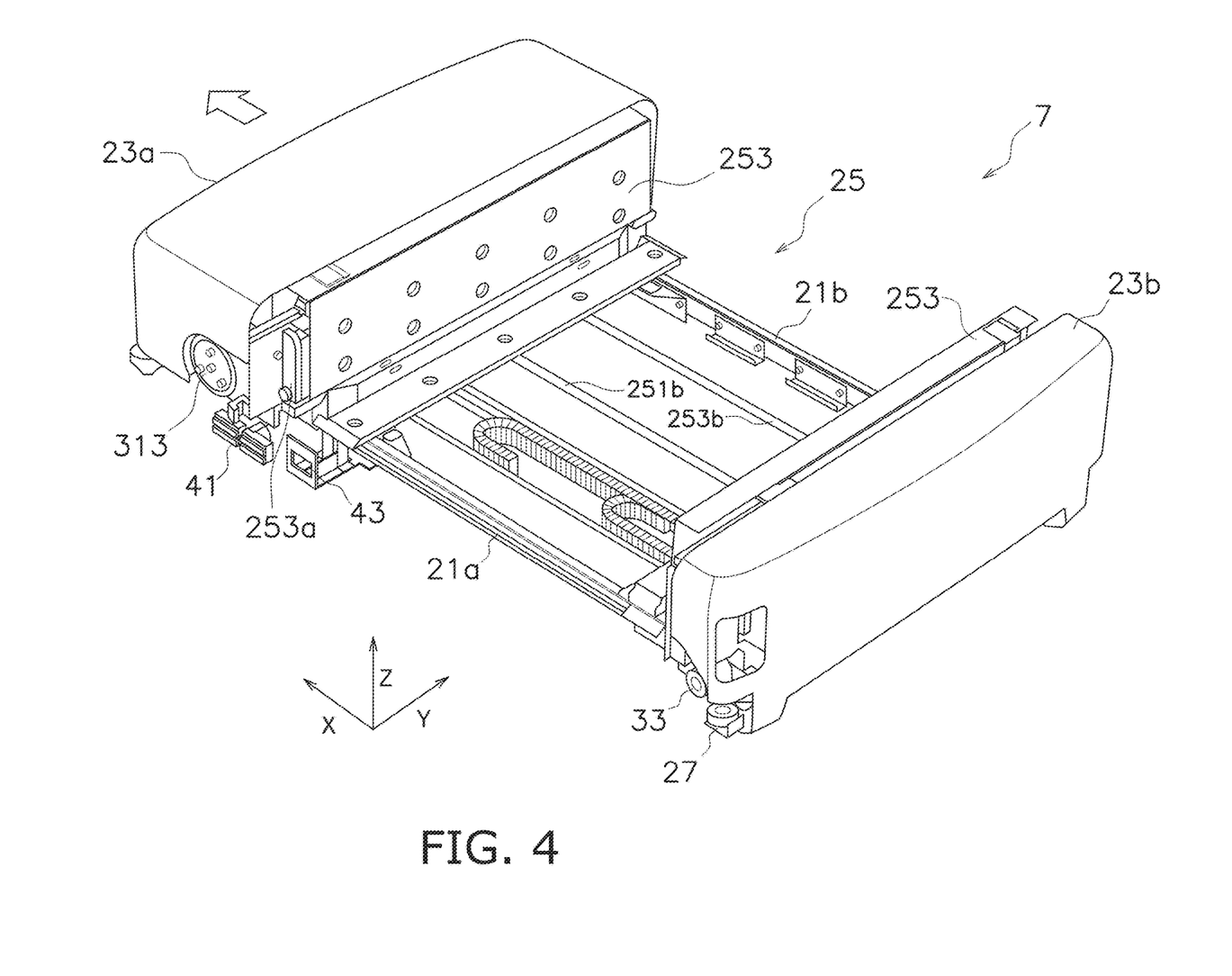
FIG. 4 is a detailed perspective view of the traveling platform.
Figure 5:
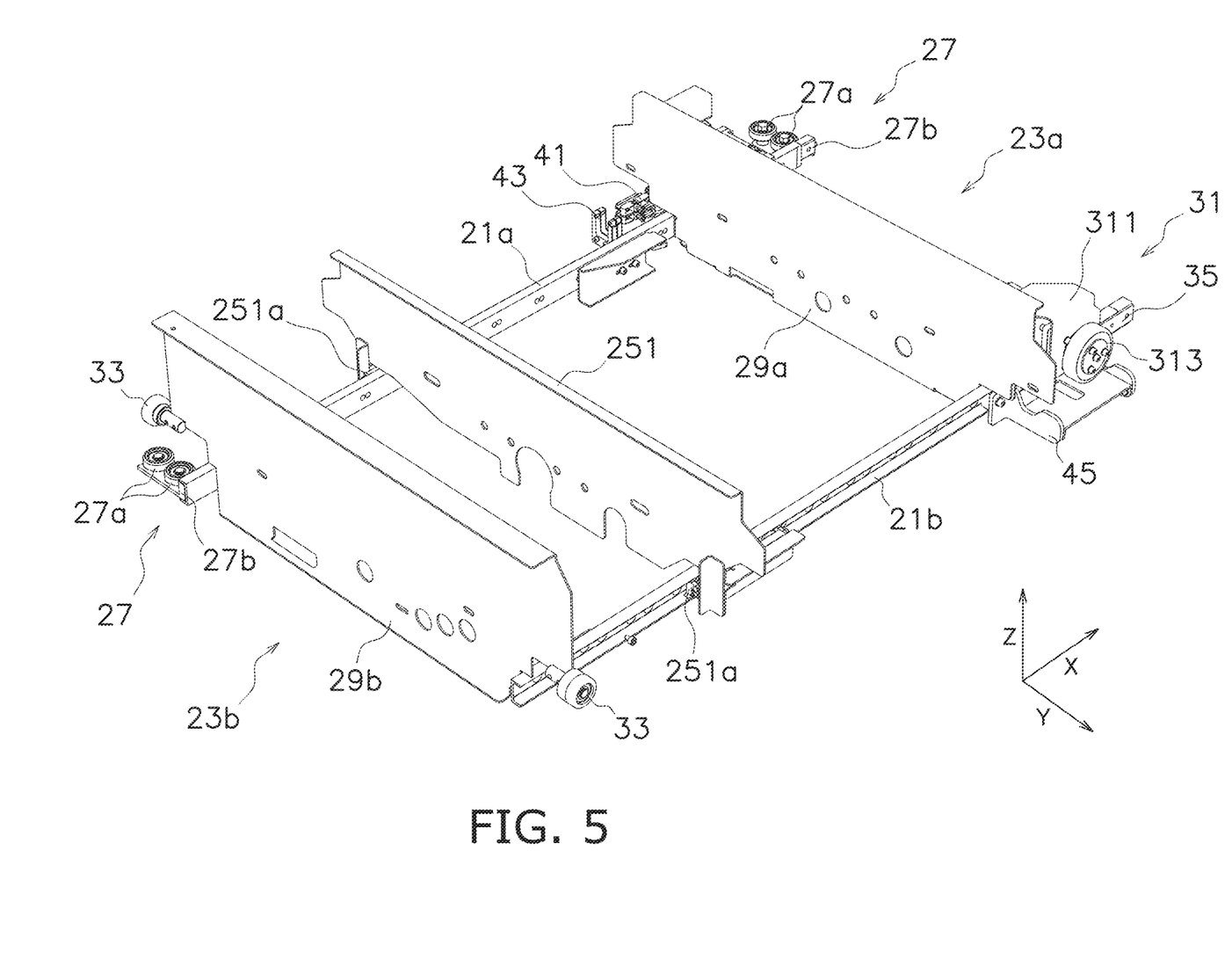
FIG. 5 is a perspective view of a guide member and its related components of the traveling platform viewed from upper right.
Figure 6:
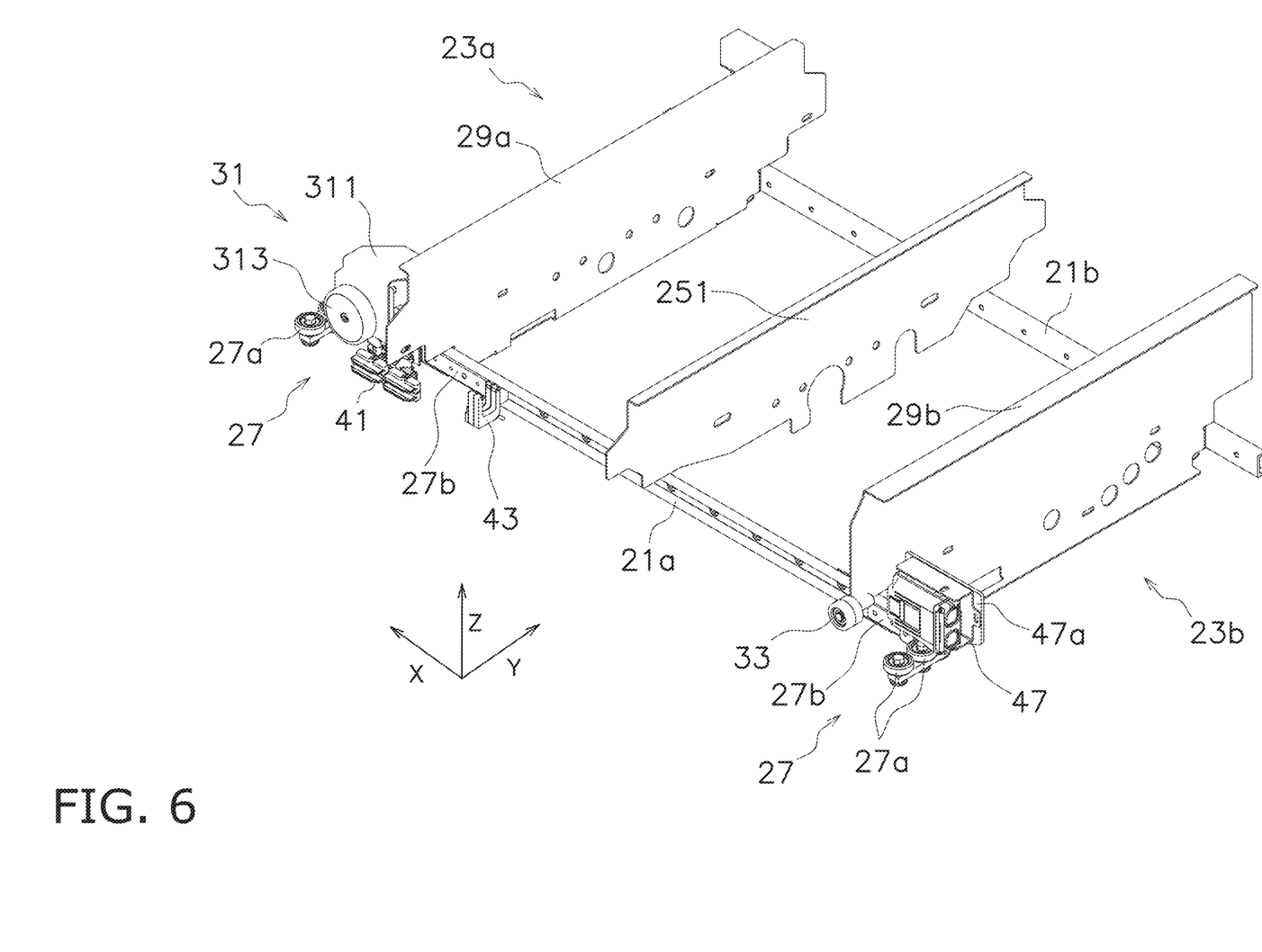
FIG. 6 is a perspective view of the guide member and its related components of the traveling platform viewed from upper left.
Figure 7:
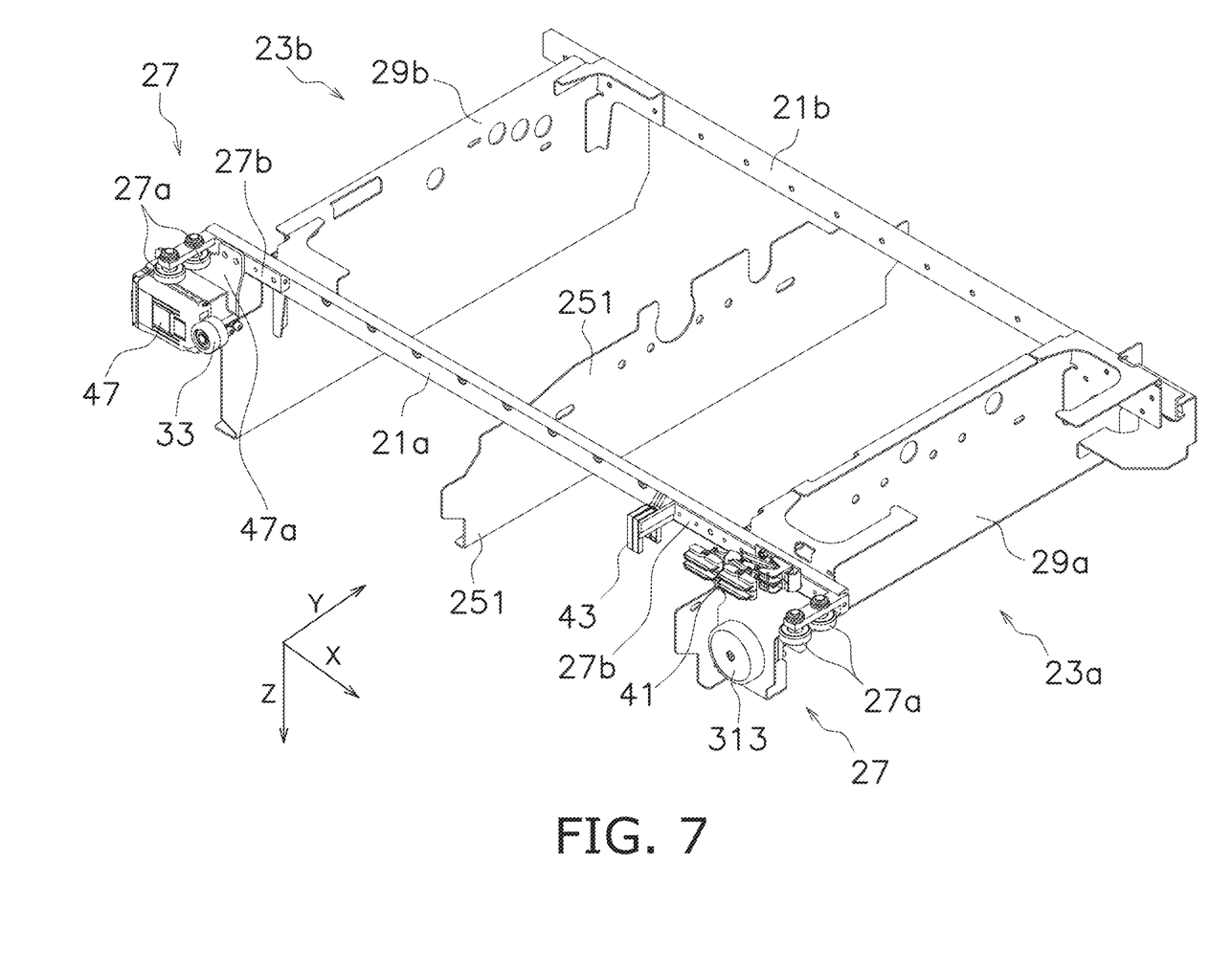
FIG. 7 is a perspective view of the guide member and its related components of the traveling platform viewed from lower left.
Figure 8:
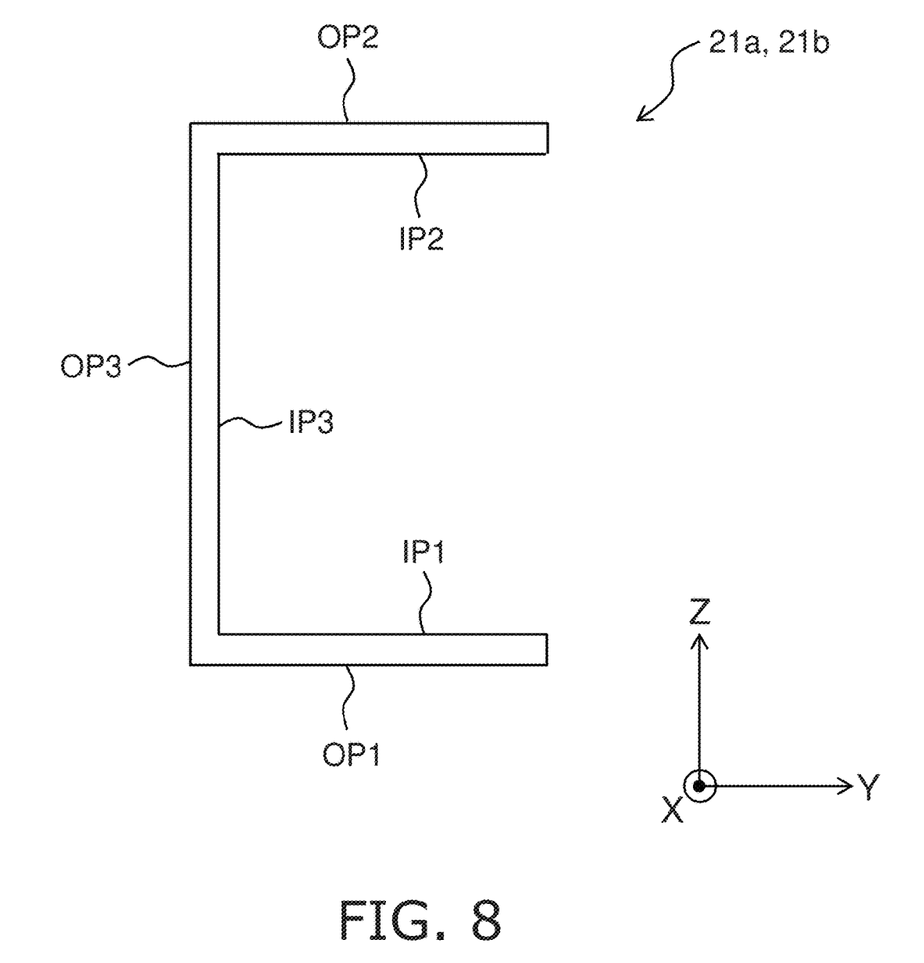
FIG. 8 is a diagram defining surfaces of the guide member.

Hereinafter, with reference to FIGS. 3 to 8, a structure of the traveling platform 7 according to the first preferred embodiment is described in detail. FIG. 4 is a detailed perspective view of the traveling platform 7. FIG. 5 is a perspective view of a guide member and its related components of the traveling platform 7 viewed from upper right. FIG. 6 is a perspective view of the guide member and its related components of the traveling platform 7 viewed from upper left. FIG. 7 is a perspective view of the guide member and its related components of the traveling platform 7 viewed from lower left. FIG. 8 is a diagram defining surfaces of the guide member.

The traveling platform 7 includes a first guide member 21a, a second guide member 21b, a first main body 23a, a second main body 23b, the transfer device 25, and the travel auxiliary roller 27.

In the traveling platform 7, the first guide member 21a is a member having function of guiding movement of a side arm 253 of the transfer device 25, and function as a frame that defines reference positions of components.

The first guide member 21a is a member elongated in one direction. As illustrated in FIGS. 5 to 8, the first guide member 21a has a C-shape in a cross section perpendicular to the length direction.

Specifically, as illustrated in FIG. 8, the first guide member 21a has a first inside surface IP1, a second inside surface IP2, and a third inside surface IP3, as inner surfaces of the C-shape. The first inside surface IP1 is a flat surface elongated in the length direction of the first guide member 21a, and is a surface disposed in a lower part of the C-shape. The second inside surface IP2 is a surface elongated in the length direction of the first guide member 21a, which is parallel to the first inside surface IP1, and is a surface disposed in an upper part of the C-shape. The third inside surface IP3 is elongated in the length direction of the first guide member 21a and forms an angle of 90 degrees with the first inside surface IP1 and with the second inside surface IP2. The third inside surface IP3 connects the first inside surface IP1 and the second inside surface IP2.

Further, the first guide member 21a has a first outside surface OP1, a second outside surface OP2, and a third outside surface OP3, as outside surfaces of the C-shape. The first outside surface OP1 is a flat surface elongated in the length direction of the first guide member 21a, and is a surface disposed in the lower part of the C-shape. The second outside surface OP2 is a surface elongated in the length direction of the first guide member 21a, which is parallel to the first outside surface OP1, and is a surface disposed in the upper part of the C-shape. The third outside surface OP3 is elongated in the length direction of the first guide member 21a and forms an angle of 90 degrees with the first outside surface OP1 and with the second outside surface OP2. The third outside surface OP3 connects the first outside surface OP1 and the second outside surface OP2.

As the first guide member 21a has the cross section of the C-shape as described above, the first guide member 21a can have a high stiffness.

When the traveling platform 7 is set to the rails 7a, the length direction of the first guide member 21a is parallel to the length direction of the rail 7a (i.e., the X direction). In other words, the first guide member 21a is a member extending in the X direction that is parallel to the rail 7a in the traveling platform 7.

That the length direction of the first guide member 21a is parallel to the length direction of the rail 7a indicates the following state. Specifically, as illustrated in FIG. 3, when the traveling platform 7 is set to the rails 7a, the third inside surface IP3 and the third outside surface OP3 of the first guide member 21a are parallel to the movement restriction part 73 of the rail 7a that is parallel to the X-Z plane, while the first inside surface IP1, the second inside surface IP2, the first outside surface OP1, and the second outside surface OP2 of the first guide member 21a are parallel to the travel flat part 71 of the rails 7a that is parallel to the X-Y plane.

In this way, as the first guide member 21a has the surface parallel to the rail 7a when setting the traveling platform 7, the first guide member 21a can be a frame that defines reference positions of components of the traveling platform 7.

Specifically, as described later, a first block member 27b, to which the various members (the travel auxiliary roller 27, the auxiliary member) of the traveling platform 7 are attached, is attached to the first guide member 21a to abut the first inside surface IP1 and the third inside surface IP3. In addition, as described above, the first inside surface IP1 is parallel to the travel flat part 71 of the rails 7a, and the third inside surface IP3 is parallel to the movement restriction part 73 of the rails 7a. In other words, in this preferred embodiment, two reference surfaces that attach the first block member 27b to the first guide member 21a are parallel to the travel flat part 71 and the movement restriction part 73 of the rails 7a (i.e., to the rail 7a).

In addition, as described later, a first connecting member 29a and a second connecting member 29b are attached to the first guide member 21a to abut the second outside surface OP2 and the third outside surface OP3. As described above, the second outside surface OP2 is parallel to the travel flat part 71 of the rails 7a, while the third outside surface OP3 is parallel to the movement restriction part 73 of the rails 7a.

In other words, in this preferred embodiment, reference surfaces that attach the first connecting member 29a and the second connecting member 29b to the first guide member 21a are parallel to the travel flat part 71 of the rails 7a and the movement restriction part 73 of the same (i.e., the rail 7a). In still other words, the first guide member 21a and the second guide member 21b have the second outside surface OP2 and the third outside surface OP3, which are parallel to the X direction, to attach the first connecting member 29a and the second connecting member 29b.

It should be noted that the cross-sectional shape of the first guide member 21a is not limited to the C-shape, as long as the reference surface, to which various members of the traveling platform 7 are attached, is parallel to the length direction of the rail 7a. For instance, the cross-sectional shape of the first guide member 21a may be an L-shape or a rectangular shape.

The second guide member 21b is a member having the same structure as the first guide member 21a described above.

The second guide member 21b is disposed apart from the first guide member 21a in the Y direction. As described later, the second guide member 21b is connected to the first guide member 21a with the first connecting member 29a and the second connecting member 29b. As the first guide member 21a and the second guide member 21b are connected to each other with these connecting members, the length direction of the second guide member 21b can be parallel to the length direction of the first guide member 21a. In other words, when the traveling platform 7 is set to the rails 7a, the length direction of the second guide member 21b is parallel to the rail 7a (the X direction).

The first main body 23a is a front main body of the traveling platform 7. The first main body 23a is disposed on one side in the length direction of the first guide member 21a and of the second guide member 21b. The side on which the first main body 23a is disposed is defined as a front side of the traveling platform 7. The first main body 23a includes the first connecting member 29a and the traveling unit 31.

The first connecting member 29a connects the first guide member 21a and the second guide member 21b at the front side end of the first guide member 21a and the second guide member 21b. Specifically, as illustrated in FIGS. 5 and 6, the first connecting member 29a connects the first guide member 21a and the second guide member 21b at insides thereof in the Y direction. In other words, the first connecting member 29a is contacted and attached to a surface facing the first guide member 21a or the second guide member 21b, out of the surfaces of the first guide member 21a and the second guide member 21b.

More specifically, the first connecting member 29a is fixed to the first guide member 21a to abut the third outside surface OP3 of the first guide member 21a. In addition, the first connecting member 29a is fixed to the second guide member 21b to abut the third outside surface OP3 of the second guide member 21b.

In this way, the first connecting member 29a (the traveling platform 7) can be assembled with reference to the guide members.

In addition, the first connecting member 29a abuts the horizontal surfaces (surfaces parallel to the X-Y plane) of the first guide member 21a and the second guide member 21b. Specifically, the first connecting member 29a abuts the second outside surface OP2 of the first guide member 21a. In addition, the first connecting member 29a abuts the second outside surface OP2 of the second guide member 21b.

In this way, a position in a height direction of the first connecting member 29a can be determined with reference to the guide members.

As described above, the first connecting member 29a is attached to the second outside surface OP2 and the third outside surface OP3 of the first guide member 21a and the second guide member 21b, i.e., the reference surfaces parallel to the length direction of the rail 7a (the X direction), and hence the first guide member 21a and the second guide member 21b can be parallel to each other.

In addition, the first connecting member 29a is attached to abut the third outside surface OP3 of the first guide member 21a and the third outside surface OP3 of the second guide member 21b, which are inside surfaces facing each other, and to abut the second outside surface OP2 of the first guide member 21a and the second outside surface OP2 of the second guide member 21b, which are the horizontal surfaces (surfaces parallel to the X-Y plane) having the same positional relationship, and hence the first connecting member 29a can be appropriately positioned.

The traveling unit 31 is disposed at an end in the left and right direction (the Y direction) of the first main body 23a, to allow the traveling platform 7 to travel along the rails 7a. The traveling unit 31 includes a drive motor 311 and a wheel 313.

The drive motor 311 is a motor fixed to a bracket BR (FIG. 3) provided to the first main body 23a, for example.

As illustrated in FIG. 3, the bracket BR that fixes the drive motor 311 preferably abuts the second outside surface OP2 and the third outside surface OP3 of the first guide member 21a and the second guide member 21b. In this way, a mounting position (positions in the Y direction and in the Z direction) of the drive motor 311 can be determined with reference to the guide members.

The wheel 313 is connected to an output rotation shaft of the drive motor 311 at a position where the circumferential part of the wheel 313 contacts with the travel flat part 71 of the rails 7a. The wheel 313 rotates on the travel flat part 71 of the rail 7a when the drive motor 311 rotates, and the traveling platform 7 can travel along the rails 7a on the travel flat part 71 of the rails 7a.

The second main body 23b is disposed at the other end in the length direction of the first guide member 21a and the second guide member 21b, i.e., the end on the side opposite to the first main body 23a. In other words, the second main body 23b is disposed on a rear end side of the traveling platform 7. In still other words, the second main body 23b is a rear main body of the traveling platform 7. The second main body 23b includes the second connecting member 29b and a driven wheel 33.

The second connecting member 29b connects the first guide member 21a and the second guide member 21b at the rear side end of the first guide member 21a and the second guide member 21b. Specifically, as illustrated in FIGS. 5 and 6, the second connecting member 29b connects the first guide member 21a and the second guide member 21b on the inside in the Y direction. In other words, the second connecting member 29b is contacted and attached to a surface facing the first guide member 21a or the second guide member 21b, out of the surfaces of the first guide member 21a and the second guide member 21b.

More specifically, the second connecting member 29b is fixed to the first guide member 21a to abut the third outside surface OP3 of the first guide member 21a. In addition, the second connecting member 29b is fixed to the second guide member 21b to abut the third outside surface OP3 of the second guide member 21b.

In this way, the second connecting member 29b (the traveling platform 7) can be assembled with reference to the guide members.

In addition, the second connecting member 29b abuts the horizontal surfaces of the first guide member 21a and the second guide member 21b (surfaces parallel to the X-Y plane). Specifically, the second connecting member 29b abuts the second outside surface OP2 of the first guide member 21a. In addition, the second connecting member 29b abuts the second outside surface OP2 of the second guide member 21b.

In this way, with reference to these guide members, a position in the height direction of the second connecting member 29b can be determined.

As described above, the second connecting member 29b is attached to the reference surfaces that are the second outside surface OP2 and the third outside surface OP3 of the first guide member 21a and the second guide member 21b, and hence the first guide member 21a and the second guide member 21b can be parallel to each other.

In addition, the second connecting member 29b is attached to abut the third outside surface OP3 of the first guide member 21a and the third outside surface OP3 of the second guide member 21b, which are inside surfaces facing each other, and to abut the second outside surface OP2 of the first guide member 21a and the second outside surface OP2 of the second guide member 21b, which are the horizontal surfaces (surfaces parallel to the X-Y plane) having the same positional relationship, and hence the second connecting member 29b can be appropriately positioned.

As described above, in this preferred embodiment, the first connecting member 29a and the second connecting member 29b have the same length and abut the second outside surface OP2 and the third outside surface OP3 at both ends in the length direction of the first guide member 21a and the second guide member 21b. In this way, the first guide member 21a and the second guide member 21b can be parallel to each other in the X direction, in the Y direction, and in the Z direction.

In addition, the first connecting member 29a and the second connecting member 29b are provided to the end sides of the first guide member 21a and the second guide member 21b that extend over the entire length of the traveling platform 7 in the travel direction, and hence the number of members that accurately attach the components of the traveling platform 7 can be reduced. As a result, the number of components of the traveling platform 7 can be reduced.

It is because the first guide member 21a and the second guide member 21b can have a plurality of functions. Specifically, most of the components of the traveling platform 7 are provided to the first main body 23a or the second main body 23b, and hence the first guide member 21a and the second guide member 21b, to which the main bodies are fixed, can have a role as a frame for the reference of positions of the components of the traveling platform 7. Furthermore, as described later, the first guide member 21a and the second guide member 21b can have a role as a guide for the side arm 253 (a frame 251) to move in the X direction.

The driven wheel 33 is disposed at the left and the right of the second connecting member 29b in a rotatable manner about the center axis, at a height position where the circumferential part contacts with the travel flat part 71 of the rails 7a, and rotates on the travel flat part 71 of the rails 7a when the traveling platform 7 travels.

The transfer device 25 is a device that transfers the article W between the traveling platform 7 and the shelf 11 of the rack 1. In this preferred embodiment, the transfer device 25 is disposed in the traveling platform 7, at an upper part of the first guide member 21a and the second guide member 21b, between the first main body 23a and the second main body 23b. As illustrated in FIGS. 4 to 7, the transfer device 25 mainly includes a pair of frames 251 and a pair of side arms 253.

It should be noted that, in FIGS. 5 to 7, for clarity of illustration, one of the pair of frames 251 is not shown.

The frame 251 supports the side arm 253 with an arm rail (not shown) provided to the side surface, so that the side arm 253 can slide in the Y direction. As illustrated in FIG. 5, each of left and right ends of the frame 251 is provided with a slide member 251a that can slide on the third inside surfaces IP3 of the first guide member 21a or the second guide member 21b (an example of the guide surface). As the slide member 251a slides on the third inside surfaces IP3, the frame 251 can move in the X direction between the first main body 23a and the second main body 23b.

In this way, as described above, the first guide member 21a has the third inside surface IP3 that is parallel to the X direction and guides the frame 251 of the transfer device 25 by slide of the slide member 251a.

As described above, the third inside surface IP3 on which the slide member 251a slides is parallel to the movement restriction part 73 of the rail 7a (i.e., the length direction of the rail 7a), and hence the slide member 251a can move accurately in parallel to the length direction of the rail 7a. In other words, the frame 251 that can move in the X direction by the slide member 251a can move accurately in parallel to the length direction of the rail 7a.

In addition, the first connecting member 29a and the second connecting member 29b enable the first guide member 21a and the second guide member 21b to be parallel to each other, and hence the frame 251 can move smoothly in parallel to the length direction of the rail 7a.

In a length direction part of the first guide member 21a and the second guide member 21b, a part in which the frame 251 can move is referred to as a "first part". Specifically, in the length direction part of the first guide member 21a and the second guide member 21b, the "first part" is a part between a mounting position of the second main body 23b and a position at which a distance in the X direction between the first main body 23*a* and the frame 251 is substantially equal to the minimum width of the article W.

In contrast, the outside part of the first part in the length direction, in which the first main body 23*a* and the second main body 23*b* are disposed, is referred to as a "second part". Specifically, in the length direction part of the first guide member 21*a* and the second guide member 21*b*, the "second part" is a part between the end of the guide members on the side of the first main body 23*a* and the position at which a distance in the X direction between the first main body 23*a* and the frame 251 is substantially equal to the minimum width of the article W, and a part between the second main body 23*b* and the end of the guide members on the side of the second main body 23*b*.

In this way, the first guide member 21*a* and the second guide member 21*b* that guide the frame 251 have not only the first part in which the frame 251 can move but also the second part that is extended from the first part in the length direction. In other words, in the guide members, the second part is formed to extend from the first part utilizing linearity of the first part parallel to the length direction of the rail 7*a*, to be parallel to the length direction of the rail 7*a*.

As described later, various members of the traveling platform 7 are attached to the second part of the guide members. In this way, the various members can be attached in parallel to the length direction of the rail 7*a*. In addition, as the various members of the traveling platform 7 can be attached to the guide members, the guide members can have a function as a member that guides the frame 251 and a function as a frame to which various members are attached.

It should be noted that the frame 251 is engaged with a ball screw 251*b* having a screw thread extending along substantially the entire length (FIG. 4). When the ball screw 251*b* is rotated by a motor (not shown) for example, the frame 251 can move in parallel to the length direction of the rail 7*a* (in the X direction).

In addition, the pair of frames 251 may both have the slide member 251*a* to move in the X direction, or only one of the pair of frames 251 has the slide member 251*a* to move in the X direction.

The side arm 253 expands and retracts in the Y direction with respect to the frame 251 using the arm rail provided to the frame 251. The side arm 253 has a member (not shown) that engages with a spline of a spline member 253*b* extending in the X direction. When the spline member 253*b* is rotated by a motor (not shown), for example, the side arm 253 can move (expand and retract) in the Y direction.

An end of the side arm 253 in the Y direction is provided with a hook 253*a* in a rotatable manner about an axis extending in the Y direction. When transferring the article W, the hook 253*a* rotates with respect to the side arm 253 so that its length direction is parallel to the X direction, and hooks the article W at the rear. In contrast, when not transferring the article W, the hook 253*a* is in the state where its length direction is parallel to the Z direction as illustrated in FIG. 4.

The travel auxiliary roller 27 restricts movement of the traveling platform 7 in the Y direction when it travels in the X direction. As illustrated in FIGS. 3 and 5 to 7, the travel auxiliary roller 27 has a pair of rollers 27*a* disposed with a predetermined space therebetween in the Y direction. The pair of rollers 27*a* are attached to the first block member 27*b* in a rotatable manner about axes extending in the Z direction.

As illustrated in FIG. 3, the pair of rollers 27*a* sandwich the movement restriction part 73 of the rail 7*a*. In this way, when the traveling platform 7 travels along the rail 7*a*, movement of the traveling platform 7 in the Y direction perpendicular to the travel direction can be suppressed.

In this preferred embodiment, one of the travel auxiliary rollers 27 is fixed to the second part at a front side of the first guide member 21*a*, and the other is fixed to the second part at a rear side of the first guide member 21*a*. Thus, two travel auxiliary rollers 27 are provided to the traveling platform 7.

In addition, the travel auxiliary roller 27 is provided to the first block member 27*b*. Specifically, the pair of rollers 27*a* are provided to the first block member 27*b*. In addition, as illustrated in FIG. 3, an abutting surface AP of the first block member 27*b* is contacted and fixed to the third inside surface IP3 of the first guide member 21*a*, and hence the front and rear travel auxiliary rollers 27 are fixed to the same third inside surface IP3 of the first guide member 21*a* extending in the X direction.

In this way, as the travel auxiliary rollers 27 at the front and the rear are fixed to the same third inside surface IP3 that extends in the X direction and is parallel to the X direction (the length direction of the rail 7*a*), the travel auxiliary rollers 27 at the front and the rear can be accurately disposed in the traveling platform 7 without largely deviating from the travel direction of the traveling platform 7 (the X direction).

In addition, as the travel auxiliary rollers 27 are attached to the first guide member 21*a* having the third inside surface IP3 parallel to the rail 7*a*, the first guide member 21*a* and the rail 7*a* can be maintained parallel to each other.

Furthermore, as the travel auxiliary rollers 27 at the front and the rear are disposed without largely deviating from the travel direction of the traveling platform 7, i.e., the extension direction of the rail, the traveling platform 7 does not largely deviate in the Y direction from the state parallel to the rail 7*a* when it travels. In other words, straight travelling stability of the traveling platform 7 with respect to the rail 7*a* is improved.

As described above, disposing the first main body 23*a* in the second part at the front side of the first guide member 21*a* and the second guide member 21*b*, while disposing the second main body 23*b* in the second part at the rear side of the first guide member 21*a* and the second guide member 21*b* means that the first guide member 21*a* and the second guide member 21*b* extend over the entire length of the traveling platform 7 in the travel direction (X direction).

Therefore, fixing one of the travel auxiliary rollers 27 to the second part at the front side of the first guide member 21*a*, while fixing the other travel auxiliary roller 27 is fixed to the second part at the rear side of the first guide member 21*a* results in the two travel auxiliary rollers 27 being located on both sides of the traveling platform 7 in the travel direction.

In this way, the two travel auxiliary rollers 27 are provided to the same third inside surface IP3 of the first guide member 21*a* parallel to the rail 7*a*, and on both sides of the traveling platform 7 in the travel direction, and hence the two travel auxiliary rollers 27 can be accurately parallel to the rails 7*a* over the entire length of the traveling platform 7.

Furthermore, as the travel auxiliary roller 27 is fixed to the first guide member 21*a* with the first block member 27*b*, it is easy to detach and attach the travel auxiliary roller 27.

As described above, when the traveling platform 7 is set to the rails 7*a*, the pair of rollers 27*a* of the travel auxiliary roller 27 sandwich the movement restriction part 73 of the rails 7*a*. Therefore, if the travel auxiliary roller 27 is attached to the traveling platform 7 before setting the traveling platform 7 to the rails 7*a*, alignment between the traveling platform 7 and the rails 7*a* is necessary when setting the traveling platform 7 to the rails 7a. Further, it is difficult to allow the pair of rollers 27a to sandwich the movement restriction part 73, and hence the load of setting work is increased.

Therefore, the traveling platform 7 without the travel auxiliary roller 27 is set to the rails 7a, and then the first block member 27b with the travel auxiliary roller 27 is inserted and fixed into the C-shape space of the first guide member 21a from the end of the first guide member 21a. Thus, the travel auxiliary roller 27 can be easily attached to the traveling platform 7. In addition, strict alignment between the traveling platform 7 and the rail 7a is not required, and hence the load of setting work of the traveling platform 7 can be reduced.

In contrast, when detaching the travel auxiliary roller 27 from the traveling platform 7, fixing of the first block member 27b with the travel auxiliary roller 27 is released in the state where the traveling platform 7 is set to the rails 7a, and then the first block member 27b inserted in the inside of the C-shape space of the first guide member 21a is extracted from the end of the first guide member 21a. Thus, the travel auxiliary roller 27 can be easily detached from the traveling platform 7. In other words, without detaching the traveling platform 7 from the rails 7a, the travel auxiliary roller 27 can be easily detached from the traveling platform 7.

It should be noted that, in this preferred embodiment, when the first block member 27b is fixed to the first guide member 21a, it abuts not only the third inside surface IP3 but also the first inside surface IP1. In this way, with reference to the first guide member 21a, the height direction position of the travel auxiliary roller 27 can be determined.

The traveling platform 7 includes the auxiliary members. The auxiliary members are various members or devices that are used when the traveling platform 7 travels or when the transfer device 25 transfers the article W between the shelf 11 and the traveling platform 7. Specifically, the traveling platform 7 includes a current collecting member 41, a detection member 43, a stopper 45, and a photoelectric device 47, as the auxiliary members. It should be noted that, in the traveling platform 7, unnecessary members among the auxiliary members described above can be eliminated.

The current collecting member 41 is a member that has an electrode contacting with a trolley member (not shown) disposed on the rail 7a to supply electric power, and collects electric power supplied from the trolley member to the traveling platform 7. In this preferred embodiment, as illustrated in FIG. 7, the current collecting member 41 is fixed to the first block member 27b that is fixed to the front side second part of the first guide member 21a.

In this way, the current collecting member 41 is disposed in the second part of the first guide member 21a via the first block member 27b. In this way, the current collecting member 41 can be easily assembled to the traveling platform 7. For instance, as described above, the current collecting member 41 can be easily detached from or attached to the traveling platform 7 by extracting the first block member 27b from the first guide member 21a or by inserting the first block member 27b into the first guide member 21a.

The detection member 43 detects a travelling position of the traveling platform 7 on the rails 7a. The detection member 43 is a device that detects, for example, light after passing through a slit provided to the rail 7a to detect a position of the slit on the rail 7a. Other than that, the detection member 43 may be a device that identifies identification information, such as a bar code reader or a QR code (registered trademark) reader.

Similarly to the current collecting member 41, the detection member 43 is disposed in the second part of the first guide member 21a via the first block member 27b.

The stopper 45 abuts a stop member (not shown) or the like provided to the rail 7a, for example, so that the traveling platform 7 is stopped at a position of the stop member on the rails 7a. As illustrated in FIG. 5, at the front side end (in the second part) of the second guide member 21b, the stopper 45 is provided to the second guide member 21b via the second block member 35 that is fixed to the third inside surface IP3 of the second guide member 21b.

The photoelectric device 47 is a device that emits light in the opposite direction to the front direction of the traveling platform 7, i.e., from the traveling platform 7 to outside in the X direction (to the rear side). The photoelectric device 47 is, for example, a communication device that communicates between the traveling platform 7 and another device, and/or a distance sensor that measures a distance in the X direction between the traveling platform 7 and another member.

In this preferred embodiment, the photoelectric device 47 is attached to the first guide member 21a via the mounting member 47a. The mounting member 47a is contacted and fixed to the first block member 27b in the second part of the first guide member 21a. The first block member 27b abutting the third inside surface IP3 of the first guide member 21a is parallel to the X direction in which the rail 7a extends, and hence the mounting member 47a that is contacted and fixed to the first block member 27b is also parallel to the X direction.

In this way, the mounting member 47a is attached to the first guide member 21a that enables the transfer device 25 (the frame 251) to move in parallel to the X direction, and further the photoelectric device 47 is attached to a mounting surface of the mounting member 47a. Thus, utilizing that the first guide member 21a is parallel to the X direction (the length direction of the rail 7a), the direction of light emission from the photoelectric device 47 is brought near parallel to the X direction (the travel direction of the traveling platform 7), so that a deviation between the direction of light emission from the photoelectric device 47 and the X direction (the travel direction of the traveling platform 7) can be reduced.

As described above, the auxiliary members (the current collecting member 41, the detection member 43, the stopper 45, and the photoelectric device 47) and the travel auxiliary roller 27 are fixed to the third inside surface IP3 of the first guide member 21a, which is parallel to the X direction, via the first block member 27b. In other words, the first guide member 21a and the second guide member 21b have the third inside surface IP3 that is parallel to the X direction for attaching the travel auxiliary roller 27 and the auxiliary member.

In addition, the auxiliary members (the current collecting member 41, the detection member 43, and the photoelectric device 47) and the travel auxiliary rollers 27 are attached to the first block member 27b. In this way, as the auxiliary members and the travel auxiliary rollers 27 are all attached to the same member as the first block member 27b, the auxiliary members and the travel auxiliary rollers 27 can be easily attached to the first guide member 21a.

In addition, as described above, the first block member 27b can be inserted into the inside of the C-shape from the end of the first guide member 21a, and the first block member 27b inserted in the inside of the C-shape can be extracted from the end of the first guide member 21a.

With the structure described above, in the state where the traveling platform 7 is set to the rails 7a, the first block member 27b is inserted into the first guide member 21a. Thus, in the state where the traveling platform 7 is set to the rails 7a, the auxiliary members and the travel auxiliary rollers 27 can be easily attached to the traveling platform 7 with small workload.

In addition, in the state where the traveling platform 7 is set to the rails 7a, the first block member 27b is extracted from the end of the first guide member 21a. Thus, in the state where the traveling platform 7 is set to the rails 7a, the auxiliary members and the travel auxiliary rollers 27 can be easily detached from the traveling platform 7 with a small workload.

As a variation, a housing of the photoelectric device 47 may be directly contacted and fixed to one of the first to third inside surfaces IP1 to IP3 of the first guide member 21a, or one of the first to third outside surfaces OP1 to OP3. In this case, the housing of the photoelectric device 47 corresponds to the mounting member 47a described above.

In addition, the travel auxiliary rollers 27 and/or the auxiliary members described above may be directly contacted and fixed to the one of the first to third inside surfaces IP1 to IP3 of the first guide member 21a, or one of the first to third outside surfaces OP1 to OP3 of the same.

Furthermore, for example, when disposing the travel auxiliary roller 27 and the photoelectric device 47 at positions apart from each other, the travel auxiliary roller 27 and the photoelectric device 47 may be individually attached to the guide member. As a case where the travel auxiliary roller 27 and the photoelectric device 47 are disposed at positions apart from each other, for example, there is a case where the photoelectric device 47 is attached to face outward at an end of the traveling platform 7 (e.g., a case where the communication device disposed at one of the rail 7a communicates with the photoelectric device 47), while the travel auxiliary roller 27 is disposed at an inside of the traveling platform 7.

It is sufficient that the travel auxiliary roller 27 is disposed with reference to one of the surfaces of the first guide member 21a as a positional reference of the traveling platform 7. For instance, as a variation illustrated in FIG. 9, the travel auxiliary roller 27 may be disposed in contact with the second outside surface OP2 at the lower part of the first guide member 21a and the third outside surface OP3 at the side surface of the same.

Figure 9:
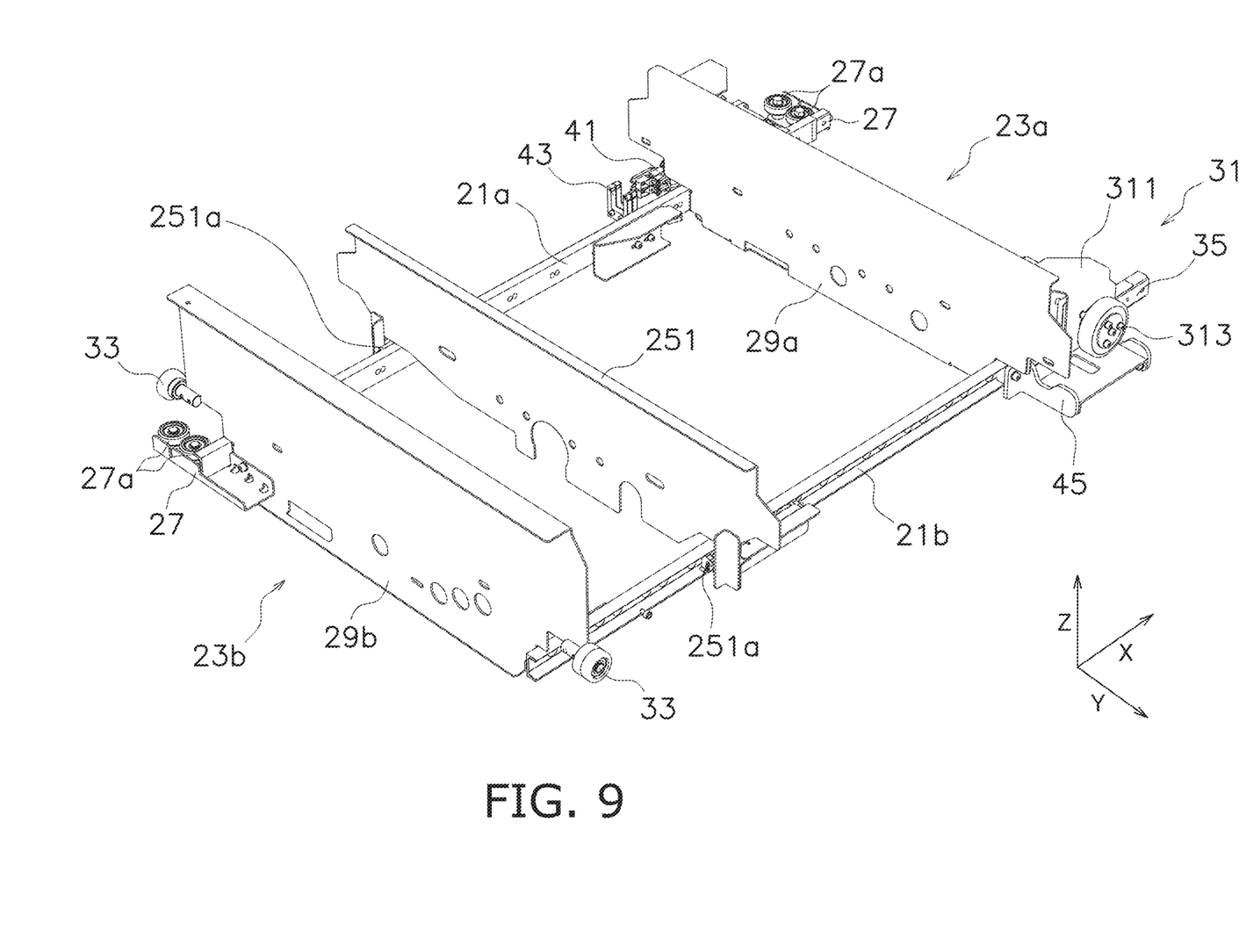
FIG. 9 is a diagram illustrating a variation of the mounting state of the travel auxiliary rollers to the guide member of the traveling platform.

FIG. 9 is a diagram illustrating a variation of the mounting state of the travel auxiliary rollers 27 to the guide member of the traveling platform 7.

The present preferred embodiment can also be described as follows.

The traveling platform 7 (an example of the traveling platform) is a traveling platform that travels along the rails 7a (an example of the travel route) extending in the X direction (an example of the first direction), and includes the traveling unit 31 (an example of the traveling unit), the side arm 253 (an example of the side arm), the first guide member 21a (an example of the guide), and two or more travel auxiliary rollers 27 (an example of the travel auxiliary rollers).

The traveling unit 31 allows the traveling platform 7 to travel in the X direction.

The side arm 253 expands and retracts in the Y direction (an example of the second direction).

The first guide member 21a extends in the X direction, and has the third inside surface IP3 (an example of the guide surface) that guides the side arm 253 in the X direction.

The two or more travel auxiliary rollers 27 are provided to the first guide member 21a, and restricts movement of the traveling platform 7 in the Y direction.

In the traveling platform 7, the plurality of travel auxiliary rollers 27 are provided to the first guide member 21a extending in the X direction that is the same as the travel direction of the traveling platform 7. As the first guide member 21a extends in the travel direction of the traveling platform 7, by providing the plurality of travel auxiliary rollers 27 to the first guide member 21a, the plurality of travel auxiliary rollers 27 can be accurately disposed along the travel direction of the traveling platform 7. As a result, straight travelling stability of the traveling platform 7 can be improved.

2. Other Preferred Embodiments

Although a preferred embodiment of the present invention is described above, the present invention is not limited to the preferred embodiment described above, and can be variously modified without deviating from the spirit of the present invention. In particular, the plurality of preferred embodiments and variations described in this specification can be variously combined as necessary.

The transfer device 25 is not limited to the rear hook type transfer device. For instance, it may be a side clamp type transfer device.

The number of the guide members provided to the traveling platform 7 is not limited to two (a pair). For instance, as the guide member, only the first guide member 21a may be disposed while the second guide member 21b may be eliminated.

In the first preferred embodiment described above, the pair of rollers 27a of the travel auxiliary roller 27 sandwich the movement restriction part 73 of the rails 7a, but the roller 27a may abut only one of surfaces of the movement restriction part 73 of the rail 7a.

In the first preferred embodiment described above, the travel auxiliary roller 27, the auxiliary member, and the photoelectric device 47 are attached to the first block member 27b that abuts the third inside surface IP3 of the first guide member 21a. In other words, the travel auxiliary roller 27, the auxiliary member, and the photoelectric device 47 are attached to the same third inside surface IP3 via the first block member 27b.

Without limiting to this, some of the members described above may be attached to a surface other than the third inside surface IP3 of the first guide member 21a, as long as the surface is parallel to the length direction of the rail 7a (the X direction).

In the first preferred embodiment described above, the travel auxiliary roller 27, the auxiliary member, and the photoelectric device 47 are attached to the same third inside surface IP3 via the first block member 27b, while the first connecting member 29a and the second connecting member 29b are contacted and attached to the second outside surface OP2 and the third outside surface OP3 of the first guide member 21a and the second guide member 21b.

Without limiting to this, some or the whole of the members described above may be contacted and attached to one of (or a plurality of) surfaces of the first guide member 21a, as long as the surface is (the surfaces are) parallel to the length direction of the rail 7a (the X direction).

Preferred embodiments of the present invention can be widely applied to traveling platforms that travel in a predetermined direction, and in particular to traveling platforms that travel while being guided by a traveling rail extending in the predetermined direction.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A traveling platform configured to travel along a travel route extending in a first direction, the traveling platform comprising:
   a side arm expandable and retractable in a second direction perpendicular to the first direction in a horizontal direction;
   a guide extending in the first direction and including a guide surface to guide the side arm in the first direction; and
   two or more travel auxiliary rollers provided to the guide to restrict movement of the traveling platform in the second direction; wherein
   the guide extends along an entire length of the traveling platform in the first direction, and includes a first portion that guides the side arm and a second portion positioned outside of the first portion in the first direction; and
   the two or more travel auxiliary rollers are located at the second portion of the guide.

2. The traveling platform according to claim 1, wherein the guide includes a pair of guides positioned with a space therebetween in the second direction; and
   the traveling platform further comprises a first connector and a second connector, which connect the pair of guides at insides of the pair of guides in the second direction on end sides in the first direction of the pair of guides.

3. The traveling platform according to claim 1, further comprising an auxiliary structure provided to the guide; wherein
   the auxiliary structure includes at least one of a current collector to supply power to the traveling platform, a detector to detect a travelling position of the traveling platform, a stopper to stop the traveling platform, and a photoelectric emitter to emit light outward in the first direction.

4. The traveling platform according to claim 3, wherein the photoelectric emitter is attached to a mounting surface of a mount abutting the guide, to emit light outward in the first direction.

5. The traveling platform according to claim 3, further comprising a block to which at least one of the two or more travel auxiliary rollers and the auxiliary structure is attached, the block being inserted in a space in the guide and fixed to the guide.

6. The traveling platform according to claim 1, wherein the travel route includes:
   a travel flat portion that is a travel flat surface for the traveling platform; and
   a movement restriction portion extending from the travel flat portion in a third direction perpendicular to the first direction and the second direction to restrict movement of the traveling platform in the second direction by abutting the travel auxiliary roller.

7. The traveling platform according to claim 6, wherein the two or more travel auxiliary rollers include a pair of rollers positioned with a predetermined space therebetween in the second direction; and
   the movement restriction portion is sandwiched between the pair of rollers.

8. The traveling platform according to claim 5, wherein a cross section of the guide has a C-shape, an L-shape, or a rectangular shape.

9. The traveling platform according to claim 8, wherein the block inserted into the guide is extractable from an end of the guide in the first direction, and the block is insertable into the guide by inserting the block from the end of the guide in the first direction.

10. An automatic warehouse comprising:
    a traveling platform; and
    a rack to store an article transferred from the traveling platform and/or an article to be transferred to the traveling platform; wherein
    the traveling platform is movable along a travel route extending in a first direction and includes:
      a side arm expandable and retractable in a second direction perpendicular to the first direction in a horizontal direction;
      a guide extending in the first direction and including a guide surface to guide the side arm in the first direction; and
      two or more travel auxiliary rollers provided to the guide to restrict movement of the traveling platform in the second direction; wherein
    the guide extends along an entire length of the traveling platform in the first direction, and includes a first portion that guides the side arm and a second portion positioned outside of the first portion in the first direction; and
    the two or more travel auxiliary rollers are located at the second portion of the guide.

* * * * *